Nov. 17, 1953 E. A. GLYNN 2,659,104
TIRE LOCATING RING ASSEMBLY FOR RETREADING MOLDS
Filed May 13, 1950 3 Sheets-Sheet 1

INVENTOR
Edwin A. Glynn
BY
ATTORNEYS

Nov. 17, 1953  E. A. GLYNN  2,659,104
TIRE LOCATING RING ASSEMBLY FOR RETREADING MOLDS
Filed May 13, 1950  3 Sheets-Sheet 2
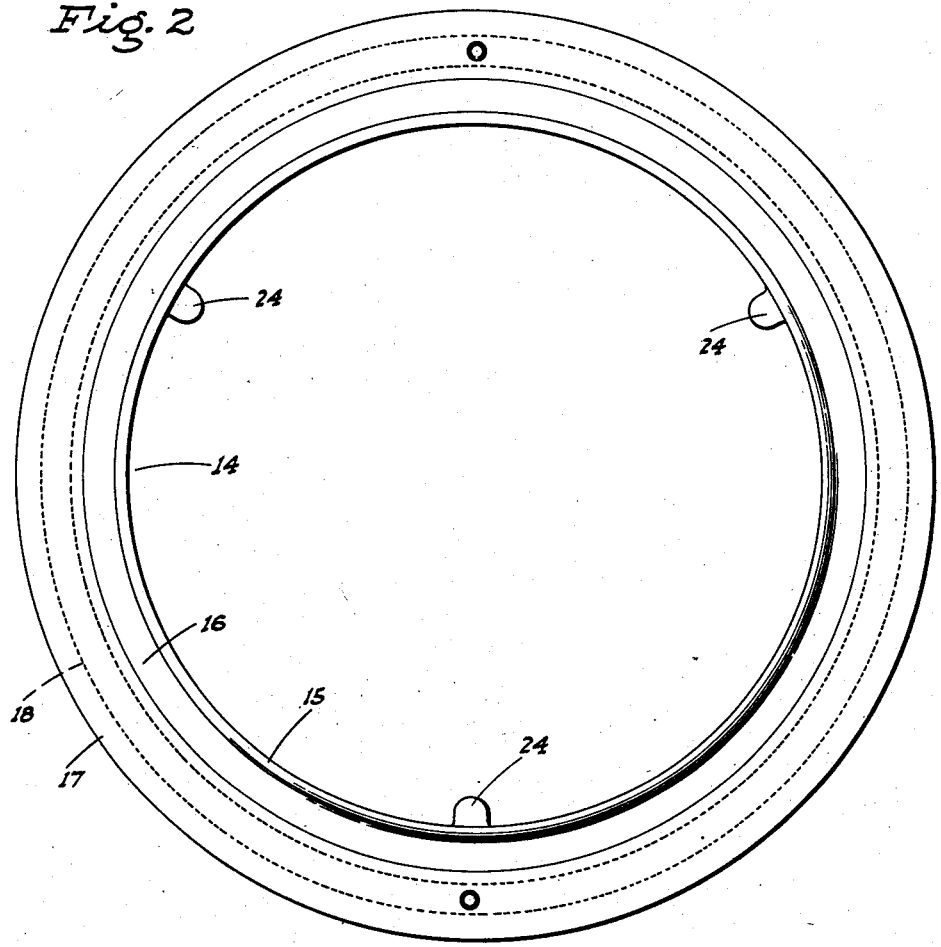
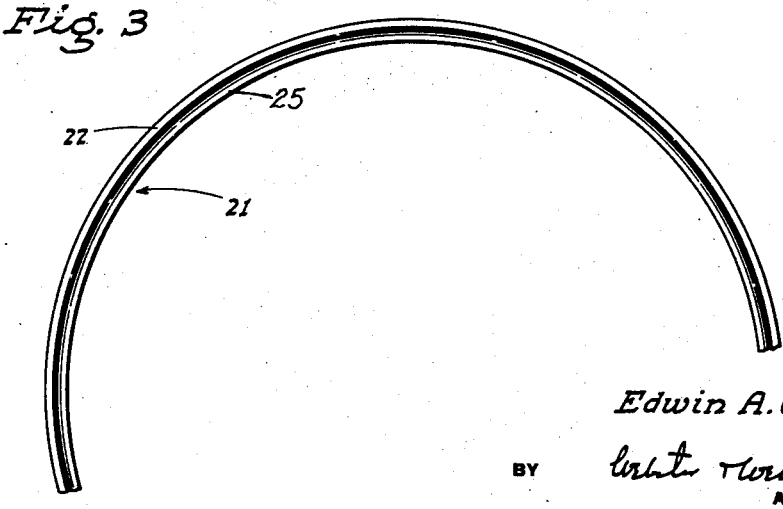
INVENTOR
Edwin A. Glynn
BY
ATTORNEYS Nov. 17, 1953  E. A. GLYNN  2,659,104
TIRE LOCATING RING ASSEMBLY FOR RETREADING MOLDS
Filed May 13, 1950  3 Sheets-Sheet 3

INVENTOR
Edwin A. Glynn
BY
ATTORNEYS

Patented Nov. 17, 1953

2,659,104

UNITED STATES PATENT OFFICE 2,659,104

TIRE LOCATING RING ASSEMBLY FOR RETREADING MOLDS

Edwin A. Glynn, Lodi, Calif., assignor to Super Mold Corporation of California, Lodi, Calif., a corporation of California Application May 13, 1950, Serial No. 161,854

5 Claims. (Cl. 18—18)

This invention pertains in general to tire retreading molds.

A major object of this invention is to provide a tire retreading mold with a novel device for locating and restraining the tire beads during a retreading operation whereby the tire is held in proper position and the tread vulcanized straight and true on the tire.

With low pressure tires as now in use, the side walls are very flexible and, unless positively located, the tire tends to skew in the mold, resulting in an off-center tread. It is an important object of this invention to provide a device which is effective to positively locate the tire in a true position in the mold and hold the tire in such position throughout the retreading operation.

Another object of the invention is to accomplish the result by engaging the tire beads with rings disposed to position said beads concentric to the mold axis and symmetrical to the retread matrix in the mold.

A further object of the invention is to mount the rings rigidly and directly on the skirts of corresponding body sections of the mold whereby to conveniently obtain the desired concentricity and spacing of said rings and the engaged tire beads.

An additional object of the invention is to provide a tire bead engaging ring assembly which is arranged, by means of included snap-on attachment rings, to accommodate tires of different diameter, and to space the beads different distances as may be required.

It is also an object of the invention to provide a tire bead engaging ring assembly which is designed for ease and economy of manufacture; the device being simple but rugged in structure.

Still another object of the invention is to provide a tire bead engaging ring assembly which is practical and reliable, and yet exceedingly effective for the purpose for which it is designed.

These objects are accomplished by means of such structure and relative arrangement of parts as will fully appear by a perusal of the following specification and claims.

In the drawings:

Fig. 2 is an end elevation of one of the primary, tire bead engaging rings, detached.

Fig. 3 is a fragmentary end elevation of one of the attachment rings, detached.

Figure 4:
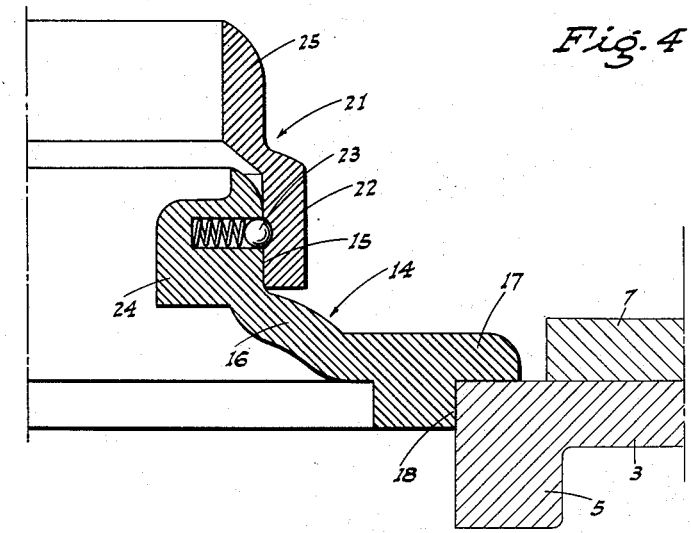
Figure 5:
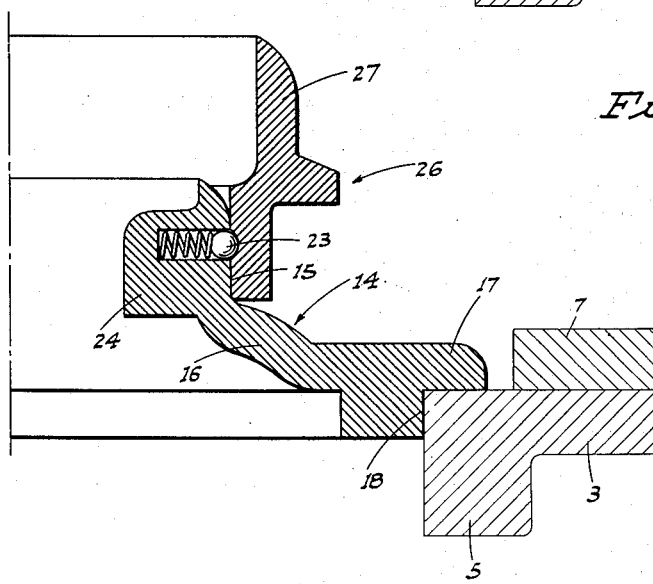
Figure 6:
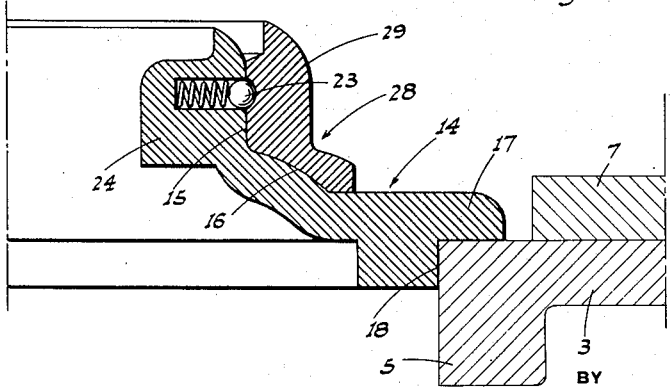

Figs. 4–6 inclusive are fragmentary radial sections illustrating different attachment rings as mounted on the primary ring.

Referring now more particularly to the characters of reference on the drawings, the invention is here shown as embodied in a tire retreading mold of the horizontal or laid-down type; the numeral 1 indicating the mold body generally.

Such mold body 1 comprises a pair of annular, matching body sections 2, each of which includes a side skirt 3 and a steam chamber 4. The side skirts 3 are formed with an enlarged strengthening flange 5 at their inner edges.

The mold body 1 encloses a matrix comprised of matrix halves 6 secured in corresponding body sections 2; the matrix halves 6 including side skirts 7 which terminate adjacent but short of the inner edges of the side skirts 3 of body sections 2.

The tire, as engaged in the mold body 1 for retreading, is shown at 8; such tire having new tread material or camelback 9 thereon which seats in the matrix.

The crown portion of the tire, together with the new tread material or camelback 9, is positively urged against the matrix by means of an air bag 10 supported in the tire by what is known as an inside curing rim 11.

The tire side walls 12 extend inwardly from opposite sides of the inside curing rim 11, and unless the side walls 12, together with the tire beads 13, are properly located and stabilized, the tire 8 may skew in the mold, with the side walls 12 slipping by opposite sides of the inside curing rim 11. If such skewing occurs the new tread is not vulcanized true and straight on the tire.

To avoid such undesirable eventuality the mold is fitted with a novel tire locating ring assembly, as follows:

The tire beads 13 are engaged and positively located by a pair of primary, tire bead engaging rings 14; such rings being disposed to locate and maintain the beads 13 concentric to the mold axis and in properly spaced relation symmetrical to the matrix.

The primary, tire bead engaging rings 14 include annular feet 15; an annular shoulder 16; and a locator flange 17. The feet 15 project toward each other from the shoulders 16, and the locator flanges 17 are peripherally notched, as at 18, for matching engagement over the inner corner of the enlarged strengthening flange 5 of the corresponding side skirt 3.

The rings 14 are held in place by hook clamps 19 attached to the locator flanges 17 by cap screws 20; the clamps 19 engaging over the enlarged strengthening flanges 5.

With the described tire locating ring assembly the tire beads 13 are automatically positioned, and held in said position, upon closing of the body sections 2; the rings 14 then being disposed so that said tire beads 13 are concentric to the mold axis; are spaced apart a predetermined distance; and lie symmetrical to the matrix. As so located and restrained the tire beads 13 hold the tire 8 true in the mold; this being especially advantageous in connection with low pressure type tires which have flexible side walls, and which would otherwise tend to skew in said mold.

Figure 1:
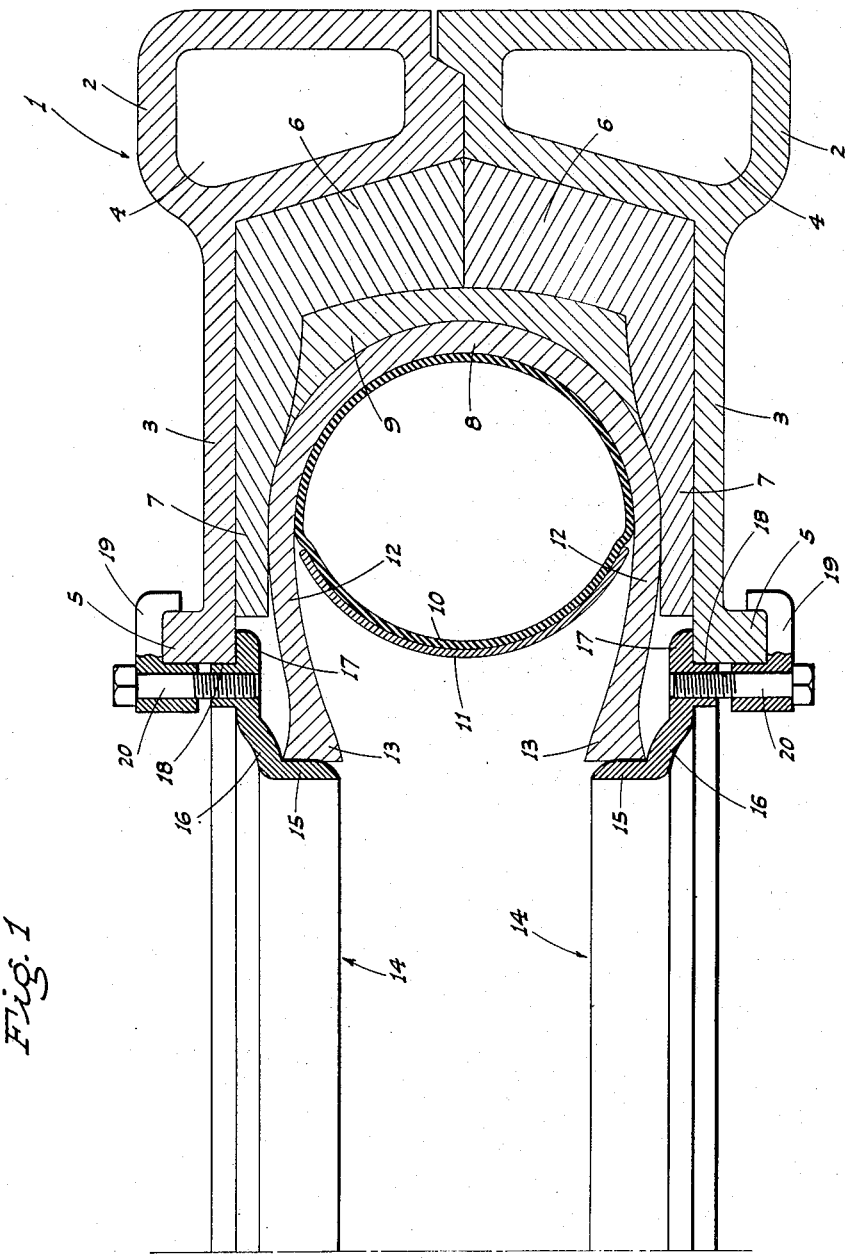
Fig. 1 is a radial section of a tire retreading mold fitted with the present invention.

Under certain working conditions it is desirable that the tire beads be located and restrained with lesser spacing than shown in Fig. 1. To accomplish this a pair of snap-on attachment rings 21, one of which is shown in Fig. 4, are employed. Each snap-on attachment ring 21 includes an annular attachment flange 22 which engages on the foot 15 of the corresponding primary ring 14. Each attachment flange 22 is releasably held in place by a plurality of spring-pressed detents 23 carried in mounting bosses 24 formed in circumferentially spaced relation about the primary ring 14.

Each attachment ring 21 includes a tire bead engaging foot 25 disposed axially inwardly of the foot 15; the result being that the tire beads when the attachment rings 21 are used, are located with lesser spacing than in Fig. 1. As the feet 15 and 25 are of the same diameter, they are for use with tires of a corresponding diameter To employ the ring assembly with tires of lesser diameter, but with a bead spacing, as in Fig. 4, the attachment ring 26, as in Fig. 5, is formed with a tire bead engaging foot 27 having a correspondingly lesser diameter; the attachment ring 26 being secured to the primary ring 14 in the same manner as in Fig. 4.

In Fig. 6 the assembly is shown as arranged for use with a tire of lesser diameter than in Fig. 1, but with the same bead spacing. Here the attachment ring 28 seats in matching relation against the foot 15 and shoulder 16 of the primary ring 14; being held in place, as before, by the spaced spring-pressed detents 23. The tire bead foot 29 of the attachment ring 28 is alined with the foot 15, but is of greater diameter whereby to accommodate the smaller tire.

The tire locating rim assembly, whether the primary rings 14 or the latter plus the described attachment rings are in use, provides a positive and effective device for properly locating the tire beads and restraining them at predetermined points so that the tire, during the retreading operation, lies true in the mold, and the new tread is vulcanized straight about the tire.

The term "retreading" as used herein is to be interpreted as meaning tire tread replacement by top capping, full capping, or full retreading.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A tire locating device for a tire retreading mold which includes a body having separable annular body sections and a matrix in the body, said device comprising a pair of tire bead engaging rings disposed in the mold concentric to the axis thereof and in axially spaced relation radially inwardly of but symmetrical to the matrix, the rings having annular tire bead engaging feet projecting toward each other, means securing the rings to corresponding body sections, and attachment rings adapted to be secured in matching relation to the feet of said first named rings; the attachment rings each having an annular tire bead engaging foot disposed laterally inwardly of the foot of the corresponding one of said first named rings.

2. A tire locating device for a tire retreading mold which includes a body having separable annular body sections and a matrix in the body, said device comprising a pair of tire bead engaging rings disposed in the mold concentric to the axis thereof and in axially spaced relation radially inwardly of but symmetrical to the matrix, the rings having annular tire bead engaging feet projecting toward each other, means securing the rings to corresponding body sections, and attachment rings adapted to be secured in matching relation to the feet of said first named rings; the attachment rings each having an annular tire bead engaging foot disposed radially inwardly of the corresponding one of said first named feet.

3. A tire locating device for a tire retreading mold which includes a body having separable annular body sections and a matrix in the body, said device comprising a pair of tire bead engaging rings disposed in the mold concentric to the axis thereof and in axially spaced relation radially inwardly of but symmetrical to the matrix, each ring having an annular tire bead engaging foot, means securing the rings to corresponding body sections, attachment rings adapted to fit on the feet of the first named rings and each having a bead engaging foot offset from the foot of the corresponding first named ring, the attachment rings being adapted to be disposed in matching engagement with said first named rings, and means adapted to releasably secure the matchingly engaged rings together.

4. A tire locating device for a retreading mold including, with a matrix-retaining mold body having side skirts, each skirt terminating in an endless outwardly enlarged annular flange defining an opening concentric with the axis of the mold; a pair of tire-bead engaging rings disposed in said opening, each ring including a portion bearing against the laterally inner face of one of the skirts, and means removably securing each ring in place in connection with the corresponding skirt; said means comprising clamping elements disposed radially of the mold on the outside thereof and engaging over the outer face of the flange and overlapping the adjacent portion of the ring exposed in the opening, and a clamping screw extending through each clamping element and threaded into said adjacent ring portion.

5. A tire locating device for a retreading mold including, with a matrix-retaining mold body having side skirts, each skirt terminating in a circular bore forming an annular locating seat concentric with the axis of the mold and radially in from the matrix; a pair of rings disposed in the mold and provided with facing tire-bead engaging feet; each ring being formed with a peripheral notch facing laterally out and away from the axis of the ring and one wall of said notch forming an annular shoulder to fit said locating seat and the other wall engaging the inner face of the corresponding skirt whereby each ring is maintained in centered relation in the mold and held against lateral outward movement relative thereto.

EDWIN A. GLYNN.

References Cited in the file of this patent

UNITED STATES PATENTS

| Number | Name | Date |
|---|---|---|
| 1,154,216 | Stengel | Sept. 21, 1915 |
| 1,913,739 | Woock | June 13, 1933 |
| 2,162,359 | Rhinevault | June 13, 1939 |
| 2,181,558 | Beckman | Nov. 28, 1939 |
| 2,319,447 | Drennan | May 18, 1943 |
| 2,440,321 | Bacon, Jr. | Apr. 27, 1948 |
| 2,513,482 | Heintz | July 4, 1950 |
| 2,599,841 | Kent | June 10, 1952 |

FOREIGN PATENTS

| Number | Country | Date |
|---|---|---|
| 30,774/30 | Australia | June 29, 1931 |